(12) United States Patent
Yang

(10) Patent No.: US 6,418,275 B1
(45) Date of Patent: Jul. 9, 2002

(54) SUPPLY DEVICE FOR USE WITH A HYDROGEN SOURCE

(75) Inventor: Jefferson Y S Yang, Orange, CA (US)

(73) Assignee: Asia Pacific Fuel Cell Technologies, Ltd. (TW)

( * ) Notice: Subject to any disclaimer, the term of this patent is extended or adjusted under 35 U.S.C. 154(b) by 0 days.

(21) Appl. No.: 09/938,685

(22) Filed: Aug. 24, 2001

(30) Foreign Application Priority Data

Apr. 16, 2001 (TW) ........................................ 90109033 A

(51) Int. Cl.[7] .............................. F24H 1/20; H01M 8/18
(52) U.S. Cl. ........................ 392/441; 392/453; 429/20
(58) Field of Search ............................... 392/441, 453, 392/459; 219/200, 201, 205; 205/343; 429/20

(56) References Cited

U.S. PATENT DOCUMENTS

| | | | | |
|---|---|---|---|---|
| 3,174,833 A | * | 3/1965 | Blackmer | .................. 137/211 |
| 4,673,528 A | * | 6/1987 | Artz et al. | ............... 149/109.2 |
| 4,755,190 A | * | 7/1988 | Harris | ......................... 141/100 |
| 5,512,145 A | * | 4/1996 | Hollenberg | .................. 136/206 |
| 5,702,491 A | * | 12/1997 | Long et al. | .................. 422/111 |

* cited by examiner

Primary Examiner—Teresa Walberg
Assistant Examiner—Thor Campbell
(74) Attorney, Agent, or Firm—Senniger, Powers, Leavitt & Roedel

(57) ABSTRACT

This invention is related to a supply device for use with a hydrogen source, comprising: at least one pressurized bottled filled with metal hydride and having a bottom end and a port end; a gas discharge valve device provided at the port end; a receiving tank having a compartment therein, the compartment having a closed end and an open end, through which open end the pressurized bottle is placed into the compartment so as to be steadily held within the compartment; at least one quick connection, provided at the closed end of the compartment and connected to the gas discharge valve device of the pressurized bottle for activating the gas discharge valve device; a heating device, provided around the compartment for heating the pressurized bottle, so as to enable endothermic reaction of the metal hydride within the pressurized bottle for releasing hydrogen from the gas discharge valve device at a constant pressure.

6 Claims, 6 Drawing Sheets

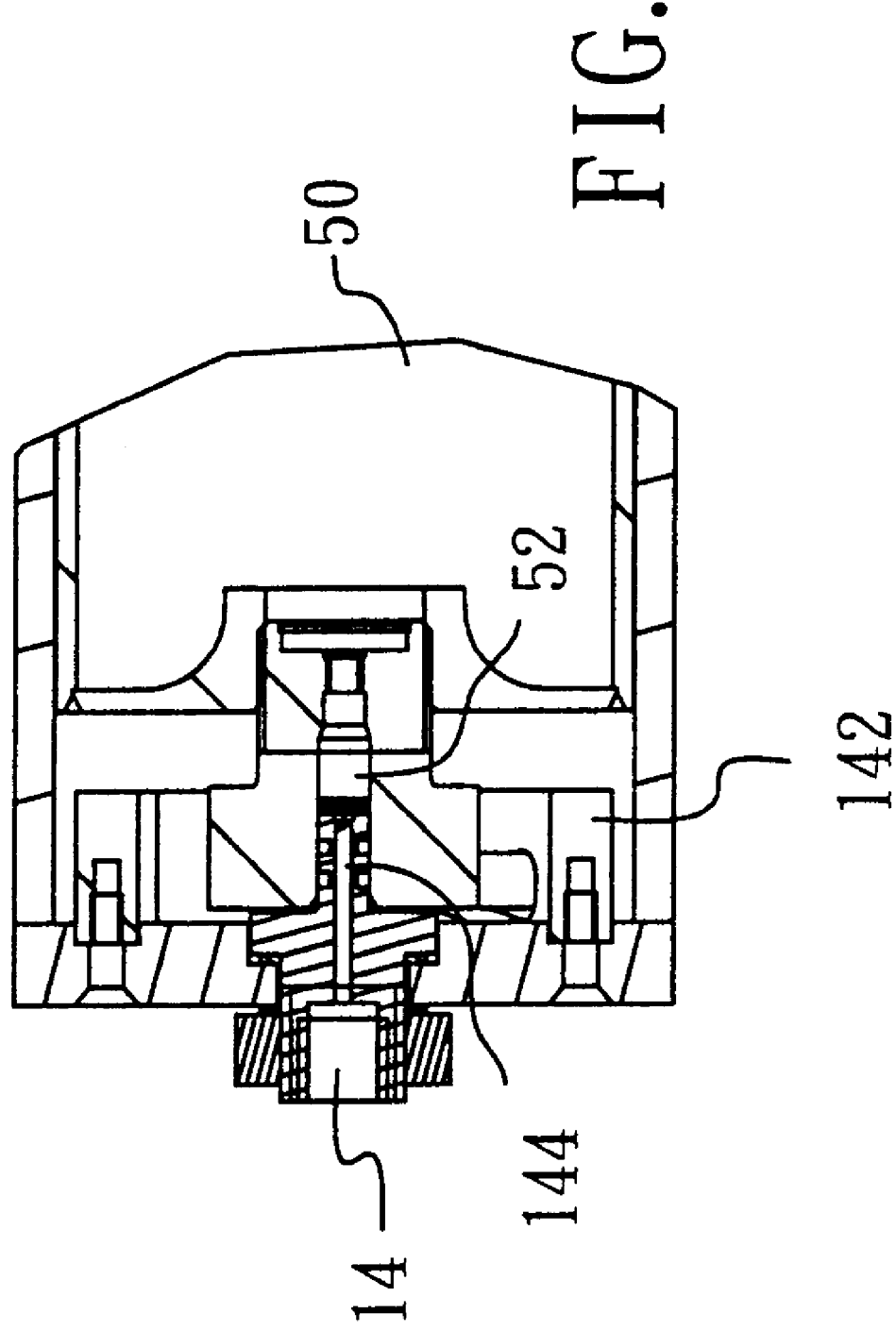

SUPPLY DEVICE FOR USE WITH A HYDROGEN SOURCE

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention is related to a supply device for use with a hydrogen source, in particular to one that is for use with a hydrogen source of a fuel cell, wherein the supply device is equipped with a heating device so as to enable endothermic reaction of metal hydride filled within the hydrogen source for discharging hydrogen from a gas discharge valve device at a constant pressure.

2. Description of the Related Art

With the rapid growth of human civilization the consumption of traditional energy sources, such as coal, oil and natural gas, increases rapidly. This results in serious pollution to the global environment and causes various environmental problems such as global warming and acid rain. It has now been recognized that the existing natural energy sources are limited. Therefore, if the present rate of energy consumption continues, all existing natural energy sources will be exhausted in the near future. Accordingly, many developed countries are dedicated to research and development of new and alternative energy sources. The fuel cell is one of the most important and reasonably priced energy sources. Compared with traditional internal combustion engines, the fuel cell has many advantages such as high energy conversion efficiency, clean exhaust, low noise, and no consumption of traditional gasoline.

In brief, a fuel cell is an electrical power generation device powered by the electro-chemical reaction of hydrogen and oxygen. Basically, the reaction is a reverse reaction of the electrolysis of water, to convert the chemical energy into electrical energy. The basic structure of a fuel cell, for example, a proton exchange membrane fuel cell, comprises a plurality of cell units. Each cell unit comprises a proton exchange membrane (PEM) at the middle, with the two sides thereof provided with a layer of catalyst, each of the two outsides of the catalyst is further provided with a gas diffusion layer (GDL). An anode plate and a cathode plate are further provided at the outermost sides adjacent to the GDL. After combining all the above elements together, a cell unit is formed.

For the practical application of a fuel cell, in order to generate a sufficient amount of electricity, oxygen and hydrogen must be supplied to the fuel cell continuously to continue the electrochemical reaction. Oxygen can usually be acquired from the atmospheric air while a special supply device must be used to supply hydrogen to the fuel cell.

One of the known measures of storing hydrogen is to store pressurized, low temperature hydrogen within a pressurized hydrogen bottle, which hydrogen is then recovered to the required operative conditions prior to releasing.

Another known measure of storing hydrogen is to use the so-called metal hydride. Metal hydride is able to discharge hydrogen at a pressure corresponding to the temperature that it experiences; the process of releasing hydrogen is an endothermic reaction. When the hydrogen stored within the metal hydride has been completely exhausted, pure hydrogen can be re-charged back to the metal hydride; the process of charging hydrogen is an exothermic reaction. The temperature which metal hydride experiences is positively proportional to the pressure of the hydrogen to be discharged from the metal hydride, such a proportional relationship may vary among metal hydrides furnished by different suppliers.

Due to the highly combustive characteristic of hydrogen, an easy and convenient method for pre-storing hydrogen within a specific container, and for releasing hydrogen as required for performing the above electrochemical reaction is needed.

BRIEF SUMMARY OF THE INVENTION

It is a primary objective of this invention to provide a supply device for use with a fuel cell, in particular to one that is for use with a hydrogen source of a fuel cell, wherein the supply device is equipped with a heating device so as to enable endothermic reaction of metal hydride filled within the hydrogen source for releasing hydrogen from a gas discharge valve device at a constant pressure.

The supply device of this invention is particularly useful in releasing hydrogen stored within metal hydride.

The major technical content of this invention is to implement at least one receiving tank having therein a compartment for receiving a pressurized bottle filled with metal hydride; and a heating device provided around the compartment for heating the pressurized bottle, so as to enable endothermic reaction of the metal hydride within the pressurized bottle for releasing hydrogen from the gas discharge valve device at a constant pressure.

The structures and characteristics of this invention can be realized by referring to the appended drawings and explanations of the preferred embodiments.

BRIEF DESCRIPTION OF THE SEVERAL VIEWS OF THE DRAWINGS

FIG. 4 is a cross-sectional, schematic view, illustrating the inter-connection between the quick connection of the supply device and the gas discharge valve device of the pressurized bottle;

DETAILED DESCRIPTION OF THE INVENTION

Figure 1:
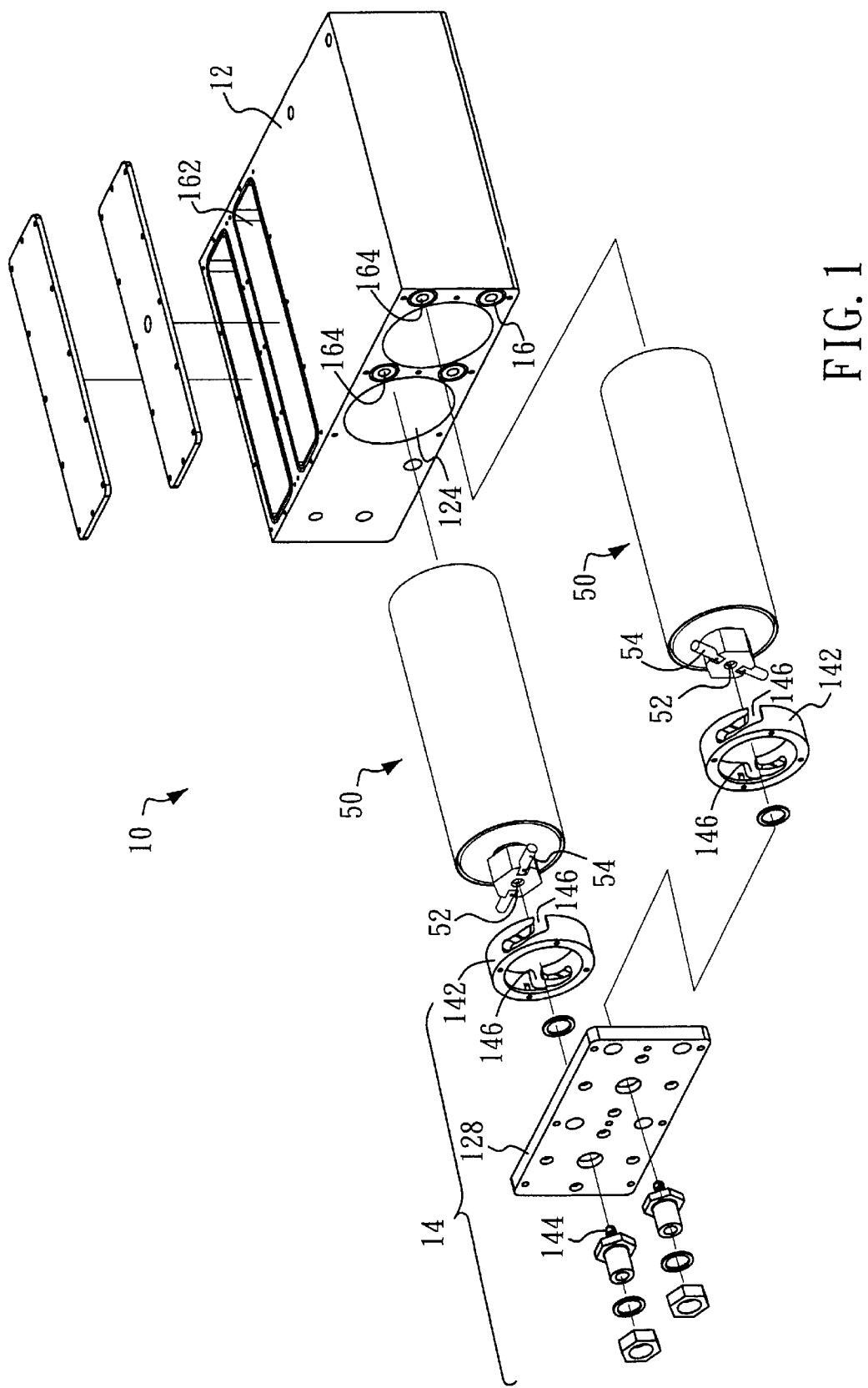
FIG. 1 is an exploded, perspective view of the supply device for use with a hydrogen source of this invention.
Figure 2:
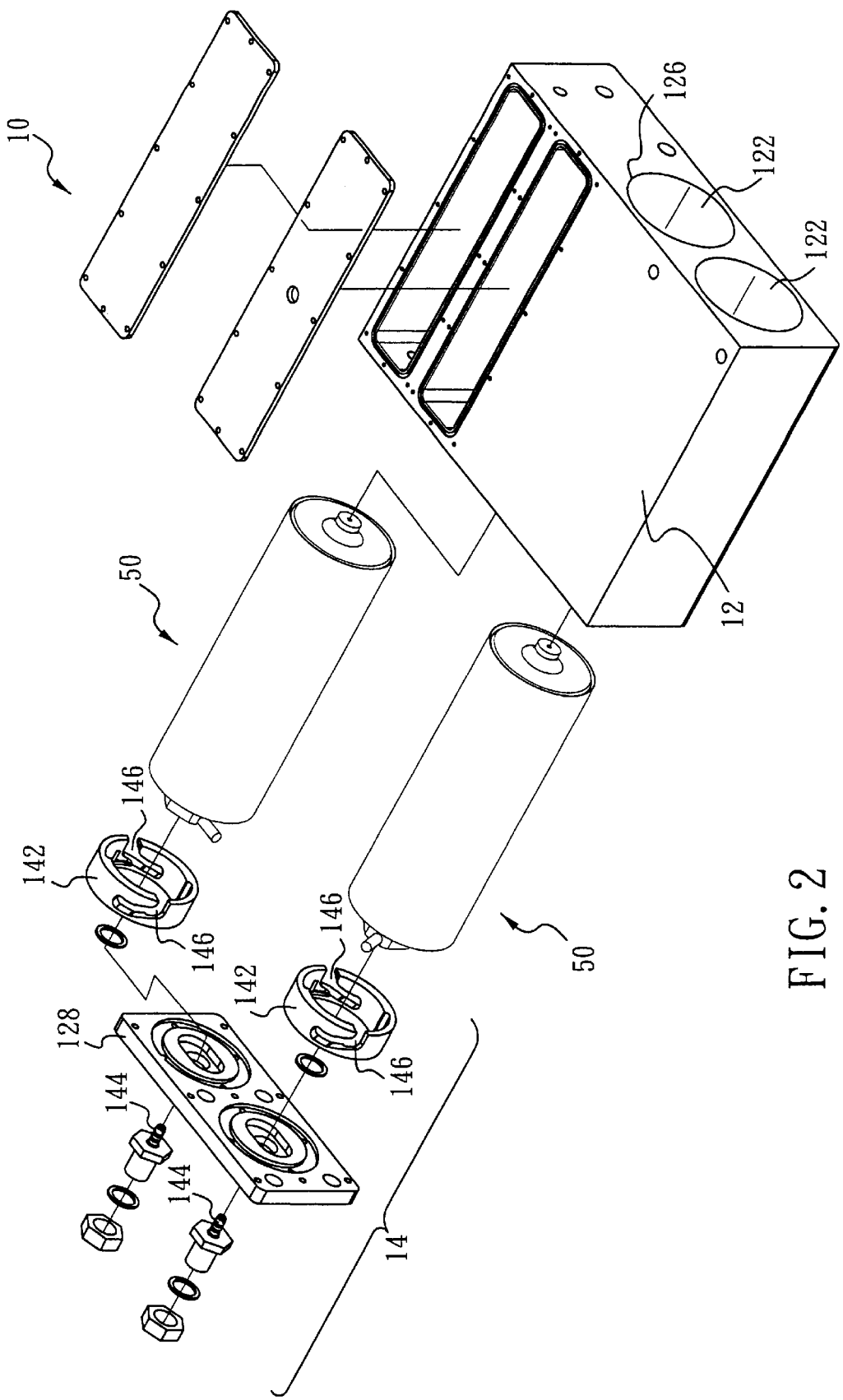
FIG. 2 is another exploded, perspective view showing the supply device for use with a hydrogen source of FIG. 1.

FIG. 1 is an exploded, perspective view of the supply device 10 for use with a hydrogen source of this invention;

FIG. 2 is an exploded, perspective view showing another end of the supply device 10.

As illustrated in FIGS. 1 and 2, a pressurized bottle 50 that may serve as a hydrogen source in this invention is illustrated in dotted lines, into which pressurized bottle 50 metal hydride (not shown) is filled. The embodiment as illustrated includes two pressurized bottles 50; however, the number of pressurized bottles 50 may vary according to one's needs. Each pressurized bottle 50 includes a bottom end and a port end; a gas discharge valve device 52 is provided at the port end to serve as a gas releasing port.

By referring to other components illustrated in FIG. 1, the supply device 10 comprises: a receiving tank 12, a plurality of quick connections 14, and a heating device.

The receiving tank 12 includes at least one compartment 122 formed therein. In this embodiment, the receiving tank 12 is formed with two compartments 122 for receiving two pressurized bottles 50.

Each compartment 122 includes a closed end 124 and an open end 126. In this embodiment, the compartment 122 is primarily constructed by a bore penetrating the receiving tank 12, at one end of the bore being affixed with a plate 128 to form the closed end 124 of the compartment 122. Other measures may certainly be adopted to form the compartment 122 within the receiving tank 12. The pressurized bottle 50 is placed into the receiving tank 12 through the open end 126 of the compartment 122.

The quick connection 14 is provided at the closed end 124 of the compartment 122. In this embodiment, two quick connections 14 are provided for connection to the two pressurized bottles 5, for activating the gas discharge valve devices 52. FIG. 4 illustrates a cross-sectional view of a quick connection 14. Each quick connection 14 includes: a retaining ring 142 affixed to the plate 128 at the closed end of the compartment 122, and an urge pin 144 perpendicularly projecting from the plate 128 at a center of the retaining ring 142 towards the compartment 122. The retaining ring 142 is formed thereon with a slit 146 inclining towards the plate 128. The slit 146 is to accommodate a locking device 54 (such as rods illustrated in the drawings) provided at the port end of the pressurized bottle 50. As such, when the pressurized bottle 50 is placed into the compartment 122 through the open end 126, and the pressurized bottle 50 is rotated towards the plate 128 by subjecting the locking device 54 of the pressurized bottle 50 to move along the slit 146, so as to be locked to the retaining ring 142, the urge pin 144 is inserted into the gas discharge valve device 52 to activate the gas discharge valve device 52 to discharge gas, as illustrated in FIG. 4.

Figure 5B:
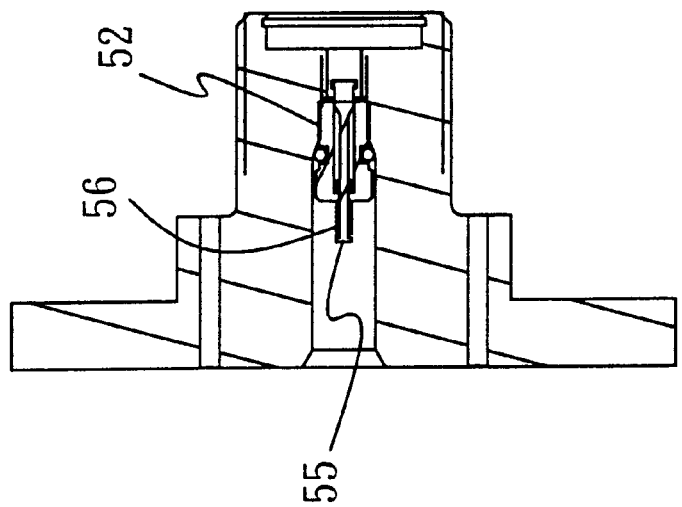
FIG. 5b is a cross-sectional, schematic view, showing the gas discharge valve device in an on state when the pressurized bottle is connected to the quick connection of the supply device.
Figure 5A:
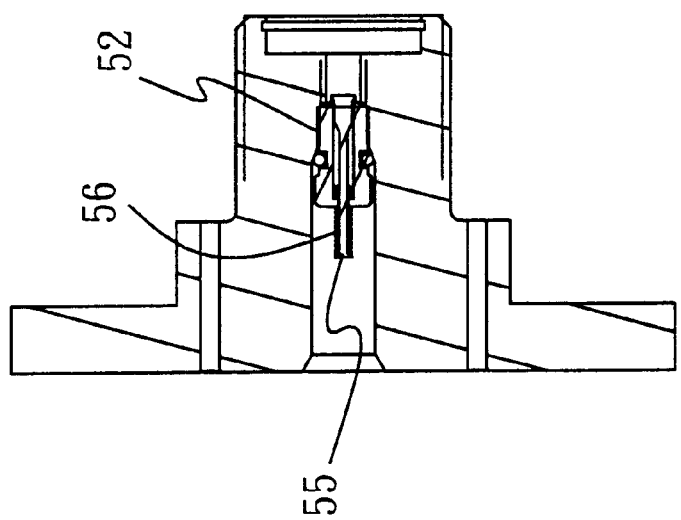
FIG. 5a is a cross-sectional, schematic view, showing the gas discharge valve device in an off state when the pressurized bottle is disconnected from the quick connection of the supply device.
Figure 6:
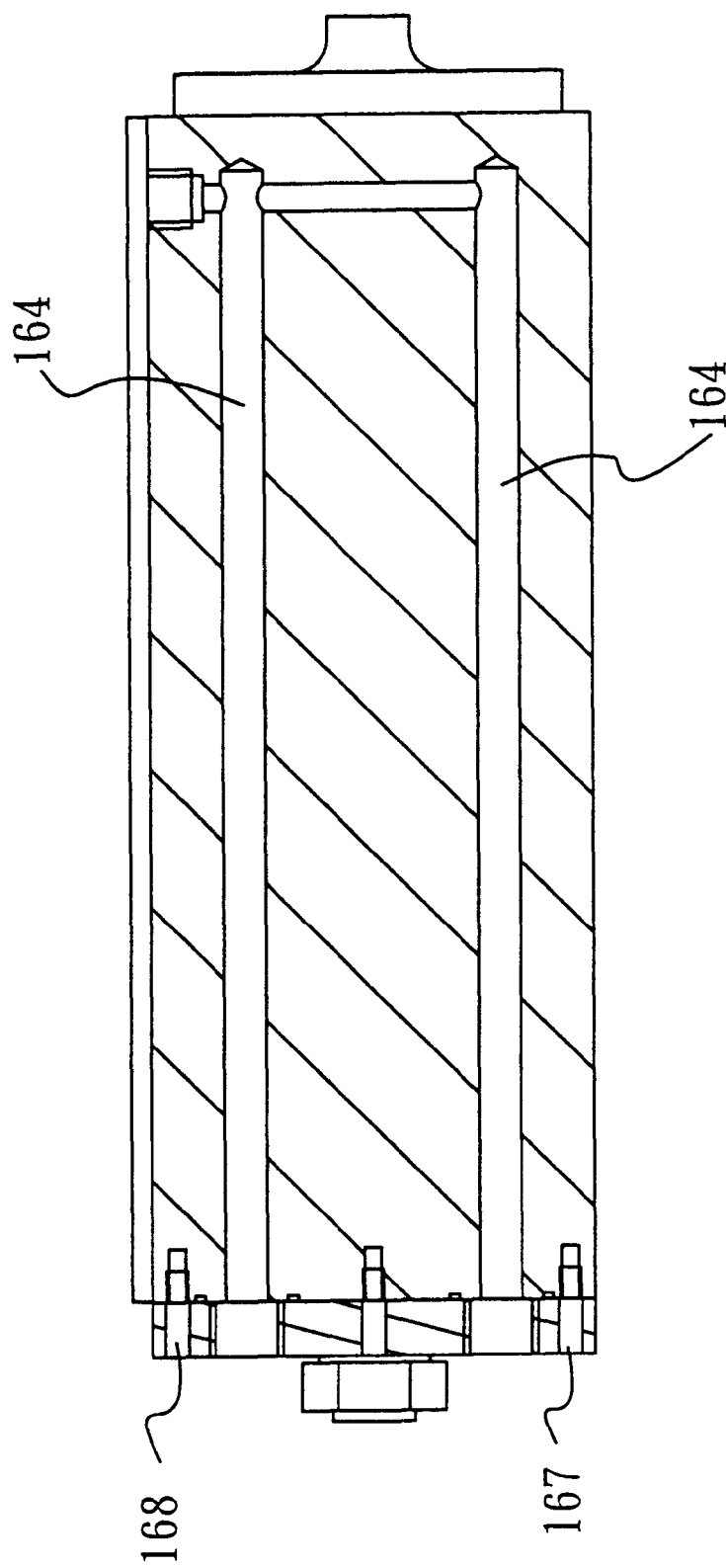
FIG. 6 is cross-sectional view showing the arrangement of the water routes of FIG. 3.

The operations of how the urge pin 144 of the quick connection 14 actuates the pressurized bottle 50 are best illustrated in FIGS. 5a and 5b. As illustrated in FIG. 5a, when the pressurized bottle 50 is yet to be connected to the retaining ring 142 of the quick connection 14, a compression spring 56 located around a valve device pin 55 of the valve device 52 is maintained at its expanded state by the gas pressure within the bottle 50, enabling the valve device 50 to its off state and preventing the valve device 50 from leaking gas. When the pressurized bottle 50 is placed into the compartment 122 and locked to the retaining ring 142 of the quick connection 14, the valve device pin 55 is compressed by the urge pin 144 of the quick connection 14 to repulse resilience of the compression spring 56, enabling the valve device pin 55 to retract backwards, as illustrated in FIG. 5b, thereby activating the valve device 52 to discharge the gas within the pressurized bottle 50 at a specific pressure.

The heating device 16 is provided around the compartment 122 for heating the pressurized bottle 50, so as to enable endothermic reaction of the metal hydride within the pressurized bottle 50 for releasing hydrogen from the gas discharge valve device 52 at a constant pressure.

The heating device 16 can be an electric heater, which is powered by the electricity generated by the fuel cell. Any other constant heating device can also be used as a heat source.

In the embodiment as shown in the drawings, hot water is used to serve as the heat source. The heating device 16, as illustrated, includes: a water tank 162 disposed within the receiving tank 12, for storing hot water; and a plurality of water routes flowing around the compartment 122, the water routes being in fluid communication with the water tank 162 such that the hot water may flow around the compartment 122 through the water routes 164.

Figure 3:
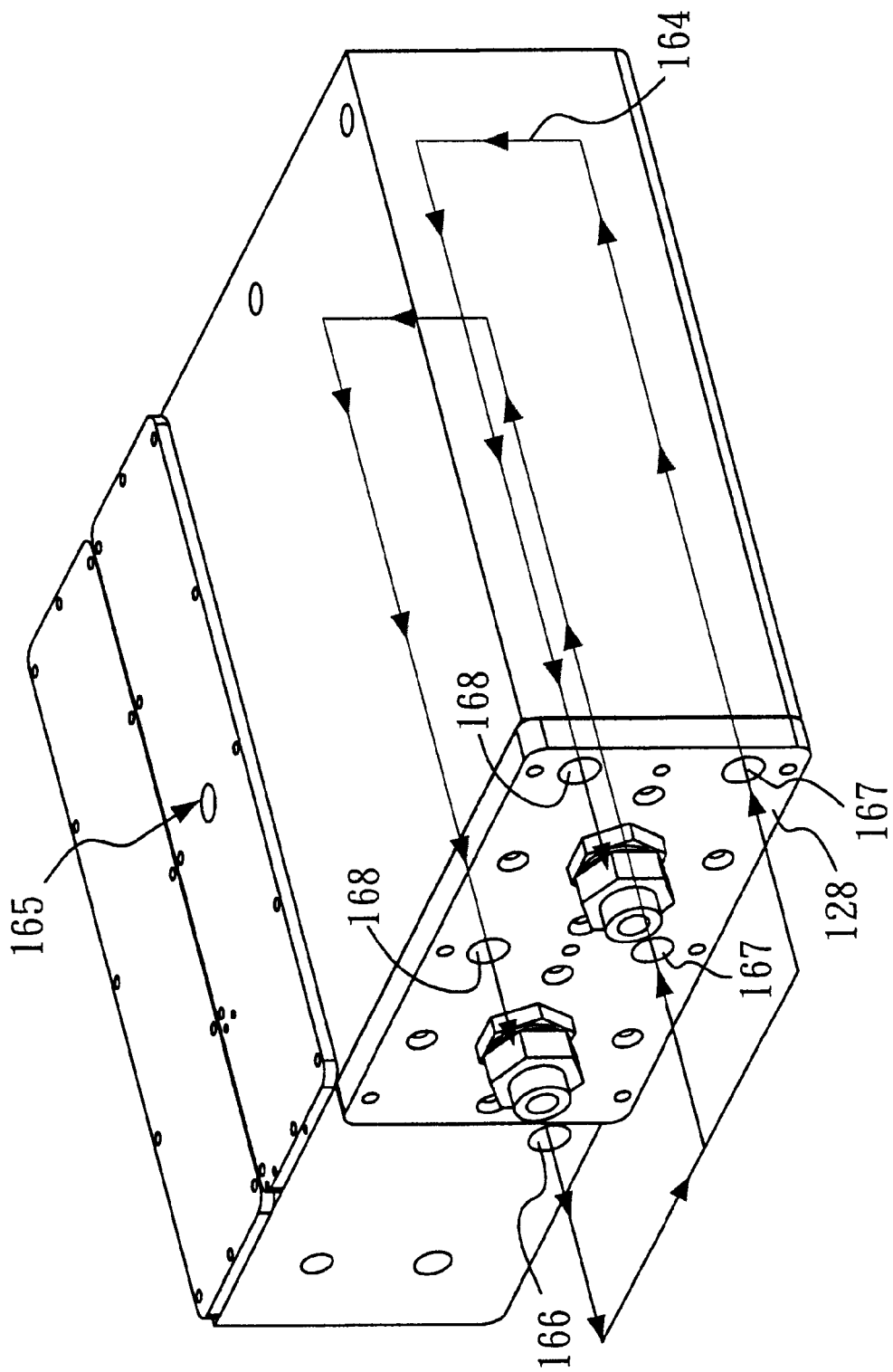
FIG. 3 is an assembled, perspective view showing the supply device for use with a hydrogen source of FIG. 1, and schematic state of water flowing within the water routes.

The assembled, perspective view showing the supply device for use with a hydrogen source in FIG. 3 further illustrates the water routes 164 and flowing directions of the hot water; FIG. 5 illustrates a side, cross-sectional view of water routes 164.

As illustrated in FIG. 3, the hot water enters the water tank 162 through a water inport 165 located above the water tank 162, then exits the water tank 162 from a water outport 166 located at a lower end of the water tank 162, and then enters the water routes 164 through a plurality of water inlets 167 formed at a lower end of the plate 128 through piping (not shown), and then exits the water routes 164 through a plurality of water outlets 168 located at a lower end of the plate 128. Because the hot water is flowing around the compartment 122, the heat energy of the hot water is conducted to the pressurized water. As stated previously, the process of releasing hydrogen from metal hydride is an endothermic reaction. Hence, the heat energy of the hot water properly serves the purpose required for the endothermic reaction, such that the metal hydride within the pressurized bottle 50 may discharge hydrogen at a selected temperature and at a corresponding pressure.

Since the supply device for use with a hydrogen source utilizes electricity generated by the fuel cell, circulated hot water, or any other possible heating system as the heat source, the supply device is able to continuously heat the metal hydride within the pressurized bottle for releasing hydrogen.

Under actual operations, it is found that fuel cells are most effective when the hydrogen is supplied at a pressure range of 50 to 300 psi. Therefore, one may implement an electronic control circuit, temperature sensors, or other conventional means to control the heating device, so as to maintain the pressurized bottle under a temperature that corresponds to the preferred pressure range, in accordance with the specific characteristics of the metal hydride filled within the pressurized bottle. When the hydrogen stored within the metal hydride has been completely exhausted, the pressurized bottle 50 can be rapidly removed from the compartment 122; pure hydrogen can be re-charged back to the metal hydride, which may then again serve as a safe and light hydrogen source.

This invention is related to a novel creation that makes a breakthrough to conventional art. Aforementioned explanations, however, are directed to the description of preferred embodiments according to this invention. Various changes and implementations can be made by those skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

What is claimed is:

1. A supply device for use with a hydrogen source, comprising:
   at least one pressurized bottle filled with metal hydride, having:
      a bottom end;
      a port end;
      a gas discharge valve device provided at the port end;
   a receiving tank having at least one compartment formed therein, for respectively receiving the at least one pressurized bottle; the compartment having a closed end and an open end, through which open end the pressurized bottle is placed in the compartment;
   at least one quick connection, provided at the closed end of the at least one compartment, to be connected to the gas discharge valve device of the pressurized bottle received in the compartment for activating the gas discharge valve device to an open position; and
   a heating device, provided around the at least one compartment for heating the pressurized bottle received therein, so as to enable endothermic reaction of the metal hydride within the pressurized bottle for releasing hydrogen from the gas discharge valve device at a constant pressure.

2. A supply device according to claim 1, wherein the heating device includes:
   a water tank formed within the receiving tank, for storing hot water;
   a plurality of water routes surrounding the compartment, the water routes being in fluid communication with the water tank so as to enable the hot water to flow around the compartment through the water routes.

3. The supply device according to claim 1, wherein each quick connection includes:
   a retaining ring, affixed to the closed end of the compartment and having a center;
   a removable locking device, being connected to the retaining ring and the port end of the pressurized bottle;
   an urge pin, projecting from the closed end of the compartment at the center of the retaining ring towards the compartment;
   whereby, when the pressurized bottle is placed into the compartment through the open end thereof and the port end of the pressurized bottle is locked to the retaining ring, the urge pin is adapted to be inserted in the gas discharge valve device to activate the gas discharge valve device to discharge the hydrogen.

4. The supply device according to claim 1, wherein the heating device is a electric heater.

5. The supply device according to claim 1, wherein the heating device maintains pressure under a pre-determined temperature, subjecting the pressurized bottle to discharge the hydrogen at a corresponding, optimum pressure.

6. The supply device according to claim 5, wherein the corresponding, optimum pressure falls within a range of 50 to 300 psi.

* * * * *